US006997290B2

(12) United States Patent
Juneau et al.

(10) Patent No.: US 6,997,290 B2
(45) Date of Patent: Feb. 14, 2006

(54) PARKING BRAKE ASSEMBLY WITH WEAR ADJUSTMENT FOR HEAVY ROAD VEHICLE DISC BRAKE

(75) Inventors: André Juneau, Duvernay Est, Laval (CA); Gérard Bouffard, Laval des Rapides, Laval (CA)

(73) Assignee: NewTech Group International Inc., Blainville (CA)

( * ) Notice: Subject to any disclaimer, the term of this patent is extended or adjusted under 35 U.S.C. 154(b) by 0 days.

(21) Appl. No.: 10/417,108

(22) Filed: Apr. 17, 2003

(65) Prior Publication Data

US 2004/0035649 A1 Feb. 26, 2004

Related U.S. Application Data

(63) Continuation of application No. PCT/CA01/01448, filed on Oct. 18, 2001.

(30) Foreign Application Priority Data

Oct. 18, 2000 (CA) .................................... 2323817

(51) Int. Cl.
*F16D 55/08* (2006.01)

(52) U.S. Cl. .................... 188/72.7; 188/72.3; 188/170; 188/106 F; 188/196 B; 188/72.9

(58) Field of Classification Search ............... 188/72.7, 188/72.6, 71.8, 71.9, 196 B, 196 BA, 196 P, 188/72.4, 72.3, 170, 106 F, 200, 72.8, 71.5, 188/72.2, 72.1, 18 A, 72.9

See application file for complete search history.

(56) References Cited

U.S. PATENT DOCUMENTS 2,615,537 A * 10/1952 Kelley ........................ 188/200

(Continued)

FOREIGN PATENT DOCUMENTS

FR 2 584 466 1/1987

(Continued)

OTHER PUBLICATIONS

Copy of PCT/IPEA/409.*

(Continued)

*Primary Examiner*—Robert A. Siconolfi
*Assistant Examiner*—Bradley T. King
(74) *Attorney, Agent, or Firm*—Ogilvy Renault

(57) ABSTRACT

In a disc brake (10) having a disc (16) and a brake shoe (82) movable towards and away from a friction surface (86) provided on one face of the disc (16), there is provided a parking brake **(22*a*/22*b*) having a pushing member (44*a*/44*b*) for moving the brake shoe (82) towards and away from the friction surface (86) of the disc (16). The parking brake (22*a*/22*b*) further includes a cam (36*a*/36*b*) displaceable between a first position in which the cam (36*a*/36*b*) forces the pushing member (44*a*/44*b*) against a biasing force acting thereon to maintain the brake shoe (82) in friction engagement with the disc (16) and a second position in which the pushing member (44*a*/44*b*) is free to move in a direction away from the disc (16) to release the brake shoe (82) from the friction surface (86) of the disc (16). A piston and cylinder arrangement (28) is provided to displace the cam (36*a*/36*b*)** between its first and second positions.

27 Claims, 5 Drawing Sheets

U.S. PATENT DOCUMENTS

| | | | | | |
|---|---|---|---|---|---|
| 3,610,375 | A | | 10/1971 | Gilliland | |
| 3,980,159 | A | * | 9/1976 | Baxendale | 188/72.7 |
| 4,776,439 | A | * | 10/1988 | Tickle et al. | 188/71.8 |
| 5,205,380 | A | | 4/1993 | Paquet et al. | |
| 5,558,185 | A | | 9/1996 | Tribuzio et al. | |
| 5,582,273 | A | * | 12/1996 | Baumgartner et al. | 188/72.6 |
| 2004/0035649 | A1 | * | 2/2004 | Juneau et al. | 188/72.7 |

FOREIGN PATENT DOCUMENTS

| | | |
|---|---|---|
| GB | 957 504 | 5/1964 |
| JP | 02 072231 | 3/1990 |
| WO | WO 02/33281 A1 * | 4/2002 |

OTHER PUBLICATIONS

Copy of STIC translation of submitted JP 02-72231.*

* cited by examiner

PARKING BRAKE ASSEMBLY WITH WEAR ADJUSTMENT FOR HEAVY ROAD VEHICLE DISC BRAKE

RELATED APPLICATIONS

This is a continuation of International Patent Application No. PCT/CA01/01448 filed Oct. 18, 2001, which claims benefit of Canadian Patent Application No. 2,323,817 filed on Oct. 18, 2000.

BACKGROUND OF THE INVENTION

1. Field of the Invention

The present invention relates to a vehicle brake system and, more particularly, to disc brakes for heavy road vehicles.

2. Description of the Prior Art

U.S. Pat. No. 5,205,380 issued to Paquet et al. on Apr. 27, 1993 discloses a disc brake assembly for heavy road vehicles. The disc brake assembly includes a parking or safety brake which is automatically activated when the road vehicle is parked. The parking brake comprises spring acting on a movable plate to urge a brake shoe against a friction surface provided on one face of a disc. A fluid bladder is provided to overcome, when expanded, the force of the spring in order to release the brake shoe from the friction surface of the disc.

Although the parking brake described in the above-mentioned patent is effective, it has been found that there is a need for a new parking brake which is more compact.

SUMMARY OF THE INVENTION

It is an aim of the present invention to provide a new parking brake for a disc brake assembly.

It is also an aim of the present invention to provide a new disc brake assembly having a system for automatically repositioning a brake shoe to compensate for wear thereof.

It is a further aim of the present invention to provide a compact parking brake which is integrated with a disc brake assembly.

Therefore, in accordance with the present invention, there is provided a disc brake assembly having a disc and a brake shoe movable towards and away from a friction surface provided on one face of the disc, and a parking brake comprising a first pushing member for moving the brake shoe towards and away from the friction surface of the disc, a first movement transmitting member displaceable between a first position wherein said first movement transmitting member forces said first pushing member against a biasing force acting thereon to maintain the brake shoe in friction engagement with the disc and a second position wherein said first pushing member is free to move in a direction away from the disc to release the brake shoe from the friction surface of the disc, and a motive means to displace said first movement transmitting member between said first and second positions thereof.

In accordance with a further general aspect of the present invention, there is provided a parking brake for mechanical connection to a wheel of a vehicle for maintaining the vehicle stationary, comprising a disc adapted to be mounted to the wheel and having a friction surface on a face thereof, a brake shoe movable towards and away from said friction surface of said disc, and a brake actuator for normally maintaining said brake shoe against said friction surface, said brake actuator comprising a first pushing member biased in a direction away from said friction surface, said brake shoe being movable by said first pushing member, and a first cam displaceable by a motive means between a first position wherein said first pushing member is pushed against a biasing force thereof by said first cam and a second position wherein said first pushing member is allowed to return to a rest position thereof under the biasing force acting thereon, and wherein said brake shoe is applied against said friction surface as long as said first pushing member is pushed by said first cam against said biasing force thereof.

In accordance with a further general aspect of the present invention, there is provided a self-adjusting brake for a wheel on a vehicle, comprising at least one disc adapted to be mounted to the wheel and having a friction surface on one face thereof, at least one brake shoe movable axially towards and away from said friction surface for friction engagement therewith and release thereof, and a brake actuator for displacing the brake shoe from an idle position to a functional position in which said brake shoe is urged against said friction surface of said disc, a wear compensating mechanism for automatically readjusting said idle position of said brake shoe to accommodate wear thereof, at least two pivotally mounted ratchet arms biased towards a closed position wherein said ratchet arms are urged in toothed engagement with a pawl member, said ratchet arms having a number of axially spaced-apart level of notches, said pawl member being loosely mounted for limited axial movement along an axially extending brake shoe projection so that when the stroke of the brake shoe becomes greater than a permitted distance of travel of said pawl member on said brake shoe projection, said ratchet arms are pivoted to an open position thereof by said pawl member to allow said pawl member to fall into a next level of notches on said ratchet arms.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
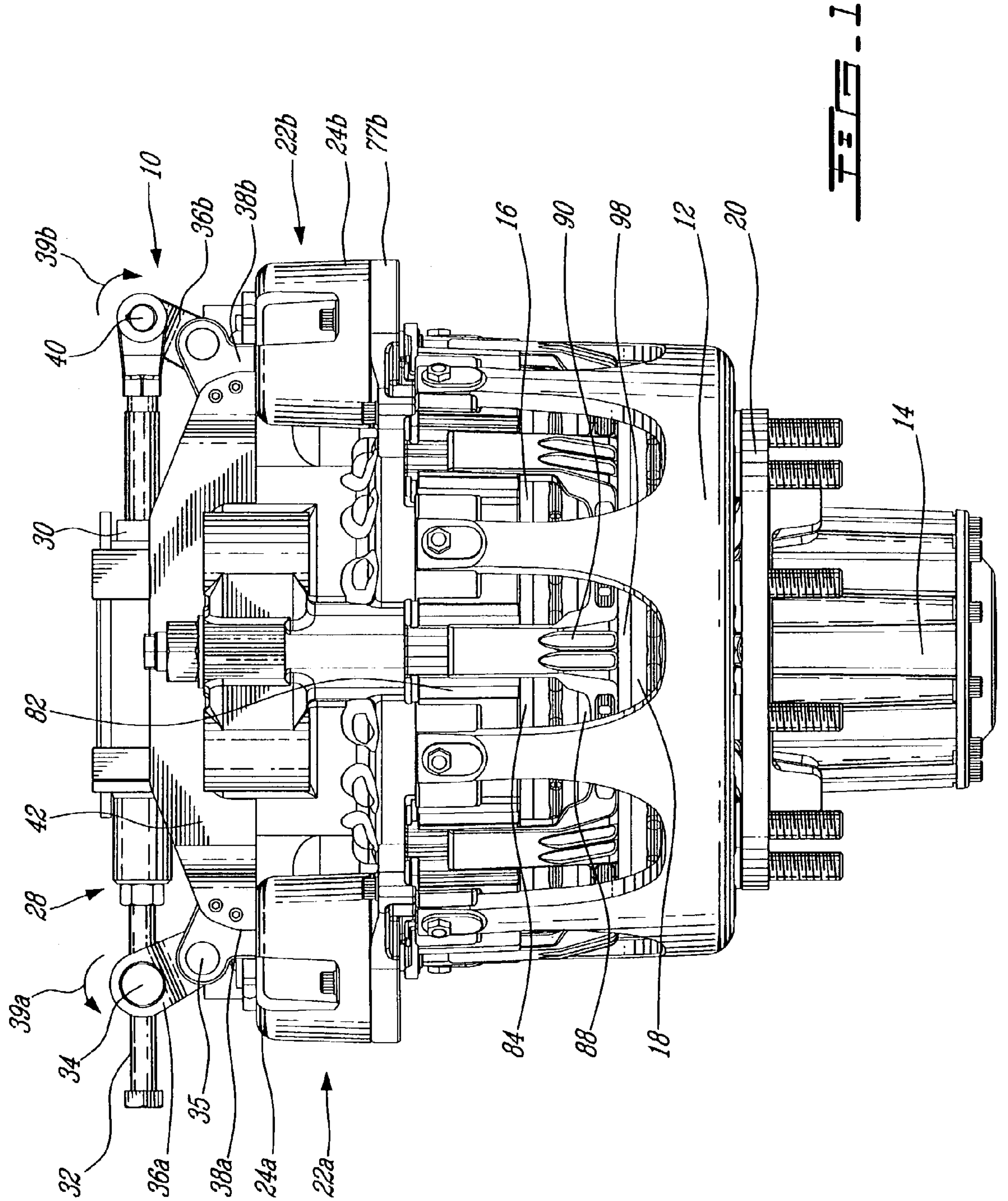
FIG. 1 is a top view of a disc brake assembly for heavy road vehicles in accordance with a first embodiment of the present invention.

Now referring to the drawings, an in particular to FIGS. 1 and 3, a disc brake assembly 10 suited for heavy road vehicles, such as trucks, busses, tractors or trailers, will be described.

As illustrated in FIG. 1, the disc brake assembly 10 comprises a housing 12 adapted to be mounted on an axle 14 of a vehicle for housing a pair of axially spaced-apart ventilated discs 16 and 18 adapted to be connected to the hub

20 of a wheel (not shown) for rotative movement therewith, as described in U.S. Pat. No. 5,205,380 issued on Apr. 27, 1993 to Paquet et al.

A pair of mechanically linked identical parking brakes 22*a*, 22*b* are housed in respective cylindrical shells 24*a* and 24*b* secured on opposed sides of the housing 12. The security or parking brakes 22*a* and 22*b* are mechanically connected with a disc brake sub-assembly 26 (FIG. 3) which is, in turn, operatively connected to the pedal brake (not shown) of the vehicle to act as the main brake of the vehicle to control the speed thereof when the latter is in operation.

Figure 2:
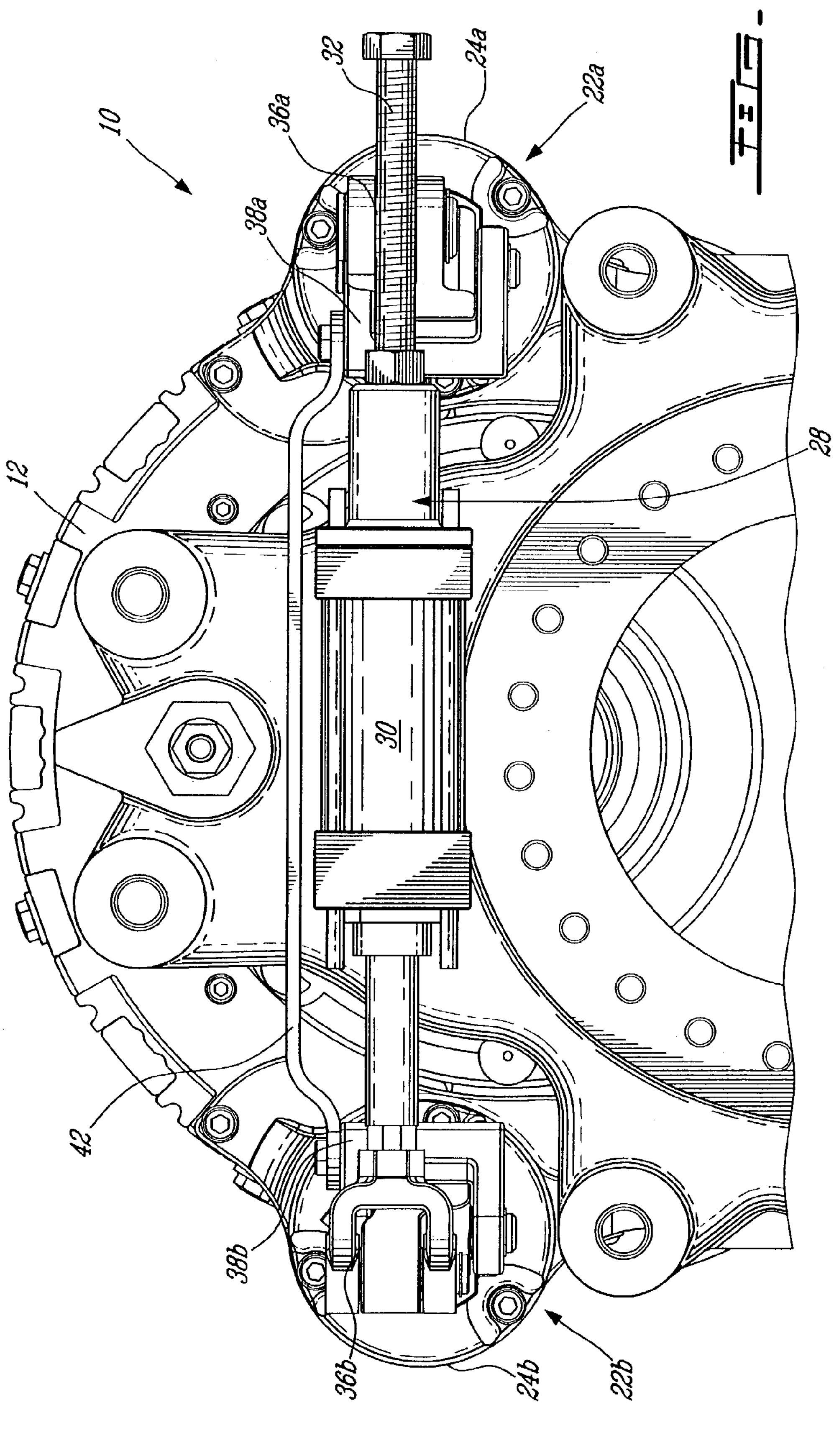
FIG. 2 is a rear plan view of the disc brake assembly of FIG. 1.
Figure 5:
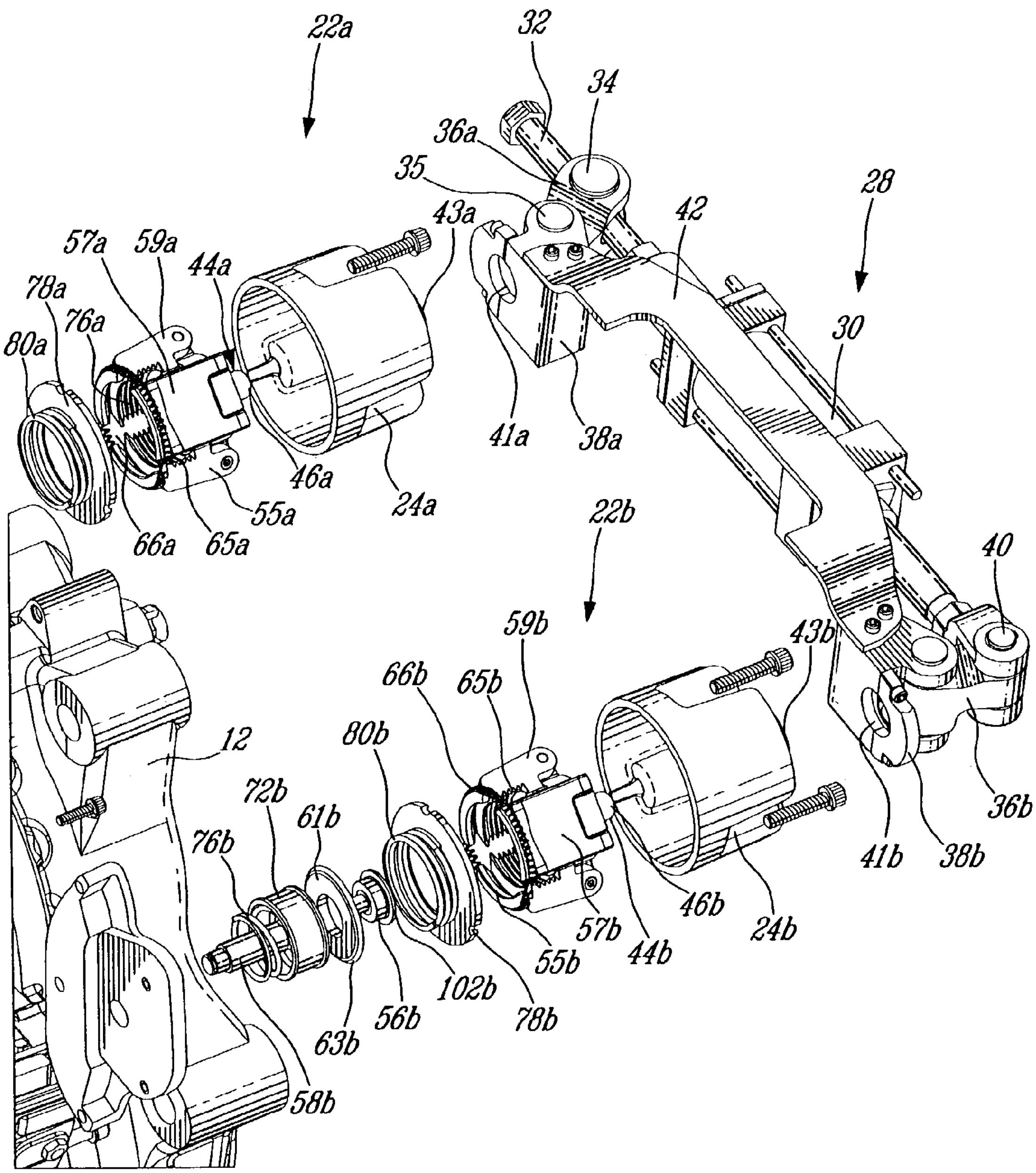
FIG. 5 is an exploded perspective view of a pair of parking brake forming part of the disc brake assembly of FIG. 1.

As shown in FIG. 2, the parking brakes 22*a* and 22*b* are mechanically linked and operated by a brake actuator including a pneumatic cylinder 28 extending therebetween. The pneumatic cylinder 28 includes a cylindrical housing 30 and a piston rod 32 normally biased in a retracted position by a spring (not shown) provided within the cylindrical housing 30. As shown in FIG. 5, the piston rod 32 is pivotally connected at 34 to a cam 36*a* which is, in turn, pivotally mounted at 35 to a bracket 38*a* secured onto the shell 24*a*. Likewise, the housing 30 is pivotally mounted at 40 to a cam 36*b* which is, in turn, pivotally mounted to a bracket 38*b* secured onto the shell 24*b*. Therefore, when the biasing force of the spring (not shown) of the pneumatic cylinder 28 is overcome by the air pressure directed into the housing 30 via conventional fluid lines (not shown), the piston rod 32 will slide axially out of the housing 30 to an extended position thereof, thereby causing the cams 36*a* and 36*b* to rotate in opposed directions, as depicted by arrows 39*a* and 39*b* in FIG. 1, respectively. As seen in FIG. 5, a brace member 42 extends between the brackets 38*a* and 38*b* to structurally unify the same and increase the rigidity of the assembly. The brackets 38*a* and 38*b* have respective bottom through bore 41*a* and 41*b* for receiving corresponding tubular necks 43*a* and 43*b* formed on respective top surfaces of the shells 24*a* and 24*b*. The term cam is herein intended to encompass any rotating or sliding piece of any definite shape for imparting a desired movement to the pushing members 44*a* and 44*b*. For instance, a sliding wedge defining an inclined surface could also be used to displace the pushing members 44*a* and 44*b*. It is also contemplated to use a pantograph linkage or a pair of scissor links in lieu of a cam to transmit a movement to the pushing members 44*a* and 44*b*.

Figure 4:
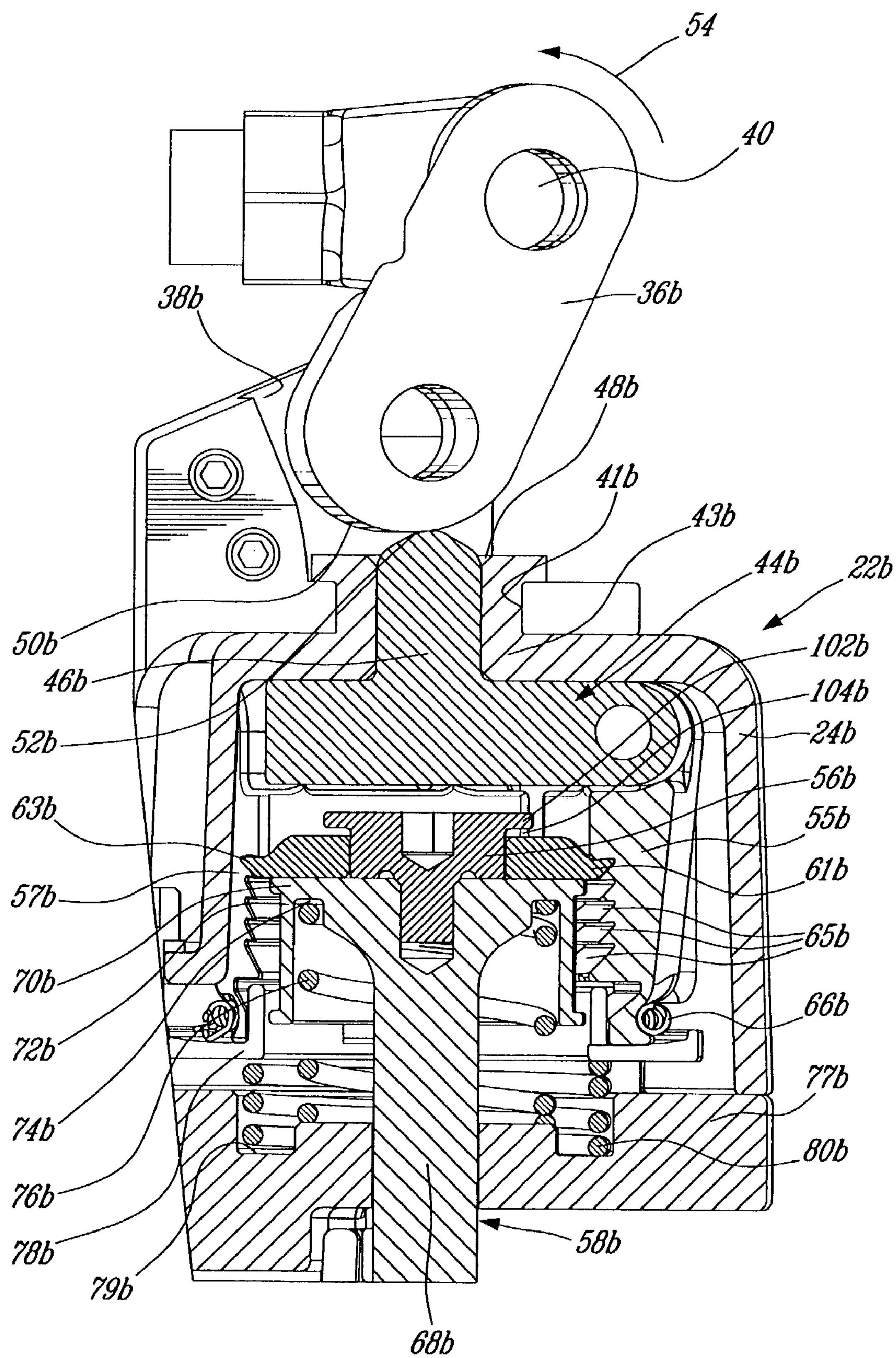
FIG. 4 is an enlarged cross-sectional view of a parking brake spring biased in an idle position thereof.

Referring now to FIG. 4, the action of the cam 36*b* on the parking brake 22*b*, as well as the structural details of the latter will now be described. The interaction between the cam 36*a* and the parking brake 22*a* is similar to that of the cam 36*b* and the parking brake 22*b* and, thus, the duplicate description thereof will be omitted. The structural details of the parking brake 22*a*, which are identical to those of the parking brake 22*b*, will not be repeated for brevity.

As seen in FIG. 4, the parking brake 22*b* includes a pushing member 44*b* mounted for axial movement within the shell 24*b* and having a cylindrical stem portion 46*b* extending outwardly of the shell 24*b* through a cylindrical passage 48*b* defined by the tubular neck 43*b* thereof. The cam 36*b* has a curved cam surface 50*b* for engaging a domed-shaped terminal distal end 52*b* of the cylindrical stem portion 46*b*. Upon rotation of the cam 36*b* in the direction indicated by arrow 54, the pushing member 44*b* will be pushed axially into the shell 24*b* due to the curvature of the cam surface 50*b*.

The pushing member 44*b* has three circumferentially spaced-apart ratchet arms 55*b*, 57*b*, 59*b* (FIG. 5) pivotally mounted thereto for engagement with a pawl provided in the form of an annular ring 61*b* loosely fitted about a piston head 56*b* securely mounted to a spring-loaded pusher or piston 58*b*. More particularly, the annular ring 61*b* has a beveled bottom rim 63*b* for mating engagement into axially spaced-apart interdental spaces or notches 65*b* defined on respective inner surfaces of the ratchet arms 55*b*, 57*b* and 59*b*. The ratchet arms 55*b*, 57*b* and 59*b* are normally biased radially inwardly to a closed position thereof against the annular ring 61*b* by an annular spring member 66*b* encircling the lower ends of the arms 55*b*, 57*b* and 59*b*. The piston 58*b* has a stem 68*b* having a radially enlarged end portion 70*b* from the periphery of which depends a cylindrical skirt 72*b* defining an annular seat 74*b* about the stem 68*b* for receiving one end of a compression spring 76*b*. The other end of the spring 76*b* is abutted against a spider 77*b* mounted on the axle 14 to support the housing 12 and receive the actuator of the disc brake-sub-assembly 26. An annular dish member 78*b* extends about the skirt 72*b* and is urged against the free terminal ends of the arms 55*b*, 57*b* and 59*b* by a second compression spring 80*b* concentrically disposed about the first spring 76*b* and having a first end abutting against the dish member 78*b* and a second opposed end received in an annular seat 79*b* defined in the spider 77*b*. The second spring 80*b* normally urges the dish member 78*b* against the arms 55*b*, 57*b* and 59*b* to resist the axial displacement of the pushing member 44*b* and, thus, allow the radial deployment of the arms 55*b*, 57*b* and 59*b* when the piston 58*b* is drawn against the spring 76*a* in response to the activation of the disc brake sub-assembly 26 to brake or control the speed of the vehicle, as will be explained hereinafter.

The piston 58*a* and 58*b* are structurally connected to an annular pressure plate 82 (see FIG. 3) by conventional fastening elements (not shown). Therefore, the axial displacement imparted to the pushing members 44*a* and 44*b* by the rotational movement of the cams 36*a* and 36*b* and transferred from the pushing members 44*a* and 44*b* to the pistons 58*a* and 58*b* via the ratchet arms 55*a*, 55*b*, 57*a*, 57*b*, 59*a*, 59*b* and the annular rings 61*a* and 61*b*, will be communicated to the pressure plate 82 which forms part of the main brake, herein referred to as the disc brake sub-assembly 26.

Figure 3:
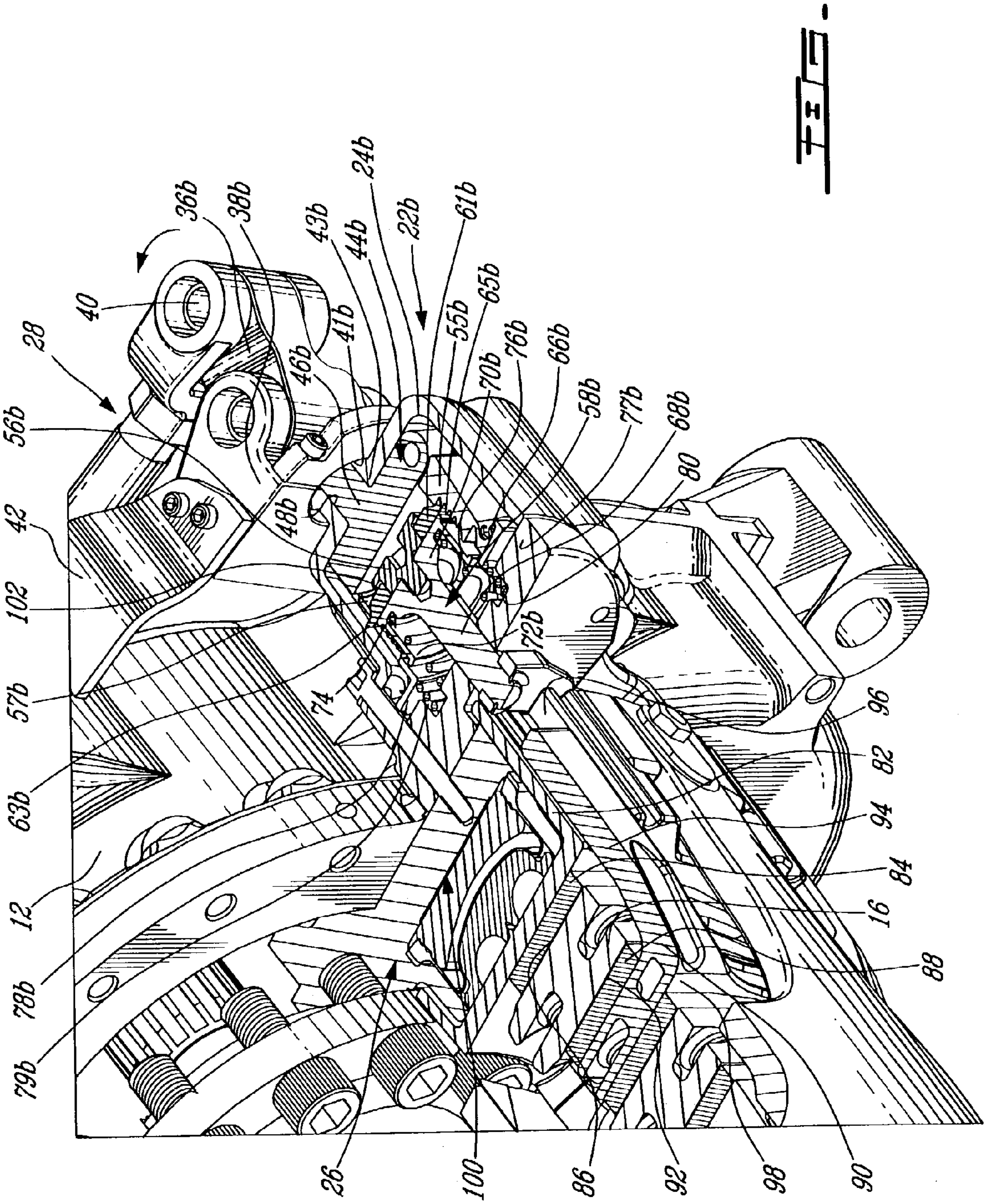
FIG. 3 is an enlarged perspective view, partly in section, of the disc brake assembly illustrated in an idle position thereof.

As seen in FIG. 3, a plurality of brake shoe lining segments 84 forming a lining ring or, alternatively, a one-piece lining ring are/is mounted to the front surface of the pressure plate 82 adjacent a radial friction surface 86 of the disc 16. A second brake shoe lining ring 88 is mounted to an axially movable intermediate annular plate 90 adjacent a second radial friction surface 92 of the disc 16 opposite the first friction surface 86 thereof. The intermediate plate 90 is slidably mounted to the pressure plate 82. As seen in FIG. 3, the intermediate plate 90 includes a plurality of axially extending fingers 94 which are slidably receive in corresponding channels 96 formed on an axially extending portion of the pressure plate 82. A third brake shoe lining 98 (FIG. 1) is mounted to the intermediate plate 90 opposite the second brake shoe lining 88 adjacent a radial friction surface (not shown) of the second disc 18. A fourth stationary brake lining (not shown) is mounted within the housing 12 adjacent a second friction surface (not shown) of the second disc 18 opposite the first friction surface thereof.

When the vehicle is not in operation, the pneumatic cylinder 28 is depressurized so as to retract the piston rod 32 and cause the rotation of the cams 36*a* and 36*b* in the direction indicated by arrows 39*a* and 39*b* in FIG. 1. The rotational movement of the cams 36*a* and 36*b* will cause the pushing members 44*a* and 44*b* to be pushed within respective shells 24*a* and 24*b*, thereby pushing the pistons 58*a* and 58*b* and the annular dish members 78*a* and 78*b* against the springs 76*a*, 76*b* and 80*a*, 80*b*, respectively. The pistons 58*a* and 58*b* will then push on the pressure plate 82 which will, in turn, press the movable brake shoe lining 84 against the friction surface 86 of the first disc 16 which is mounted for limited axial movement on the axle 14 via a spline arrangement (not shown), as described in U.S. Pat. No. 5,205,380 issued to Paquet et al. Therefore, the first disc 16 will also be pushed against the second brake shoe lining 88 which will, in turn, push the intermediate plate 90, and the third brake shoe lining 98 against the second disc 18 which will move axially against the stationary brake shoe lining (not shown).

When the pneumatic cylinder 28 is pressurized, the springs 76*a* and 76*b* act on the pistons 58*a* and 58*b* to maintain the brake shoe linings 84, 88 and 98 out of engagement with the discs 16 and 18, thereby allowing the discs 16 and 18 to rotate freely with the associated wheel (not shown).

When the vehicle is operated, the parking brakes 22*a* and 22*b* are disabled, i.e. the pneumatic cylinder 28 is pressurized, and the speed of the vehicle is controlled by a pneumatic brake actuator 100 (FIG. 3) mounted within the spider 77*b* for selectively pushing the pressure plate 82 towards the discs 16 and 18 to engage the movable brake shoe linings 84, 88 and 98 and the stationary brake shoe lining (not shown) with the radial friction surfaces of the discs 16 and 18, as described hereinbefore with respect to the parking brakes 22*a* and 22*b*. As the pressure plate 82 is pushed by the pneumatic brake actuator 100, the pistons 58*a* and 58*b* are pulled against the springs 76*a* and 76*b* thereof. As seen in FIG. 4, the piston head 56*b* has a flange 102*b* which is axially spaced from the annular ring 61*b* to define therewith a play 104*b* when the piston 58*b* is at rest, i.e. when the piston 58*b* is not solicited by external axial forces. It is understood that a similar play exist between the piston head 56*a* and the annular ring 61*a*. These plays correspond to the play existing between the brake shoe linings 84, 88 and 98 and the discs 16 and 18 when the brake assembly 10 is not operated and the discs 16 and 18 are free to rotate.

Therefore, when the pneumatic actuator 100 is activated to displace the pressure plate 82, the pistons 58*a* and 58*b* will travel with the pressure plate 82 over an axial distance corresponding to the play 104*b*. Accordingly, the annular rings 61*a* and 61*b* will remain trapped in the first level of notches 65*a* and 65*b*. However, when the brake shoe linings 84, 88 and 98 will become worn, the thickness thereof will reduce and consequently the displacement of the pressure plate 82 and the pistons 58*a* and 58*b* necessary to effect braking will increase. At a certain level of wear of the brake shoe linings 84, 88 and 98, the displacement of the pressure plate 82 and the pistons 58*a* and 58*b* under the governed of the pneumatic operator 100 will be such that the annular rings 61*a* and 61*b* will be drawn by the piston heads 56*a* and 56*b*, thereby causing the radial deployment of the arms 55*a*, 55*b*, 57*a*, 57*b*, 59*a* and 59*b* which are retained against axial movement by the spring loaded dish members 78 and 78*b*, to allow the annular rings 61*a* and 61*b* to move axially relative to the arms 55*a*, 55*b*, 57*a*, 57*b*, 59*a* and 59*b* beyond the first level of notches 65*a* and 65*b* thereof. When the pressure exerted by the pneumatic actuator 100 is released, the springs 76*a* and 76*b* will urge the pistons 58*a* and 58*b* and the annular rings 61*a* and 61*b* towards their original position but the respective beveled rims 63*a* and 63*b* of the annular rings 61*a* and 61*b* will fall into the second level of notches 65*a* and 65*b* of the arms 55*a*, 55*b*, 57*a*, 57*b*, 59*a* and 59*b*, which tend to return to their original closed position under the biasing force of the annular spring 66*a* and 66*b*, thereby preventing the pistons 58*a* and 58*b* from returning to their original resting When the brake shoe linings 84, 88 and 98 will become further worn, the annular rings 61 and 61*b* will automatically fall in the next level of notches 65*a* and 65*b* and so on. This mechanism allows to automatically compensating for the wear of the brake shoe linings 84, 88 and 98 to maintain the original adjustment of the parking brakes 22*a* and 22*b* irrespectively of the condition of the brake shoe linings 84, 88 and 98.

What is claimed is:

1. In a disc brake assembly having a disc and a brake shoe movable towards and away from a friction surface provided on one face of the disc, a parking brake comprising a first pushing member for moving the brake shoe towards and away from the friction surface of the disc, a first movement transmitting member displaceable between a first position wherein said first movement transmitting member forces said first pushing member against a biasing force acting thereon to maintain the brake shoe in friction engagement with the disc and a second position wherein said first pushing member is free to move in a direction away from the disc to release the brake shoe from the friction surface of the disc, and a motive means to displace said first movement transmitting member between said first and second positions thereof, wherein said first movement transmitting member includes a first cam having a cam surface engaged with a free distal end of said first pushing member, wherein said motive means includes a piston and cylinder arrangement and wherein said first cam is pivoted at one end thereof to said piston and cylinder arrangement and at a second opposite end thereof to a fixed support structure, and further comprising a second cam and a second pushing member, said piston and cylinder arrangement being connected at one end thereof opposite said first cam to said second cam to displace said second cam to a first position thereof in order to force said second pushing member against a biasing force acting thereon to maintain the brake shoe in frictional engagement with the disc.

2. A disc brake assembly as defined in claim 1, wherein said piston and cylinder arrangement has a housing and a piston rod, said first and second cams being respectively pivotally connected to said housing and said piston rod to cause said first and second cams to rotate in opposed directions upon axial movement of said piston rod relative to said housing.

3. A disc brake assembly as defined in claim 2, wherein said piston rod is normally biased in a retracted position to maintain said first and second cams in respective first positions thereof so that said brake shoe be forced against the disc by said first and second pushing members.

4. A disc brake assembly as defined in claim 1, wherein said piston and cylinder arrangement extends in a direction generally perpendicular to a direction of motion of said first pushing member, and wherein said first cam has a pivot axis perpendicular to said piston and cylinder arrangement.

5. A disc brake assembly as defined in claim 1, wherein at least two ratchet arms are pivotally mounted to said first pushing member and biased towards a closed position wherein said ratchet arms are urged in toothed engagement with a pawl member, said ratchet arms having a number of axially spaced-apart level of notches, said pawl member being loosely mounted for limited axial movement along an axially extending brake shoe projection so that when the stroke of the brake shoe becomes greater than a permitted distance of travel of said pawl member on said brake shoe projection, said ratchet arms are pivoted to an open position thereof by said pawl member to allow said pawl member to fall into a next level of notches on said ratchet arms in order to compensate wear of said brake shoe.

6. A disc brake assembly as defined in claim 5, wherein said brake shoe projection is biased in a direction away from said disc.

7. A disc brake assembly as defined in claim 6, wherein said brake shoe projection is biased by a return spring.

8. A disc brake assembly as defined in claim 5, further comprising a biasing member to prevent said first pushing member from being drawn by said brake shoe projection under normal brake mode operation.

9. A brake assembly as defined in claim 8, wherein said biasing member is provided in the form of a spring-loaded dish member.

10. A parking brake for mechanical connection to a wheel of a vehicle for maintaining the vehicle stationary, comprising a disc adapted to be mounted to the wheel and having a friction surface on a face thereof, a brake shoe movable towards and away from said friction surface of said disc, and a brake actuator for normally maintaining said brake shoe against said friction surface, said brake actuator comprising a first pushing member biased in a direction away from said friction surface, said brake shoe being movable by said first pushing member, and a first cam displaceable by a motive means between a first position wherein said first pushing member is pushed against a biasing force thereof by said first cam and a second position wherein said first pushing member is allowed to return to a rest position thereof under the biasing force acting thereon, and wherein said brake shoe is applied against said friction surface as long as said first pushing member is pushed by said first cam against said biasing force thereof, wherein said first cam has a cam surface engaged with a free distal end of said first pushing member, wherein said motive means includes a piston and cylinder arrangement, and wherein said first cam is pivoted at one end thereof to said piston and cylinder arrangement and at a second opposite end thereof to a stationary bracket, and further comprising a second cam and a second pushing member, said piston and cylinder arrangement being connected at one end thereof opposite said first cam to said second cam to displace said second cam in order to force said second pushing member against a biasing force acting thereon to maintain the brake shoe in frictional engagement with the disc.

11. A parking brake as defined in claim 10, wherein said piston and cylinder arrangement has a housing and a piston rod, said first and second cams being respectively pivotally connected to said housing and said piston rod to cause said first and second cams to rotate in opposed directions upon axial movement of said piston rod relative to said housing.

12. A parking brake as defined in claim 11, wherein said piston rod is normally biased in a retracted position to cause said first and second cams to force said first and second pushing members.

13. A parking brake as defined in claim 10, wherein at least two ratchet arms are pivotally mounted to said first pushing member and biased towards a closed position wherein said ratchet arms are urged in toothed engagement with a pawl member, said ratchet arms having a number of axially spaced-apart level of notches, said pawl member being loosely mounted for limited axial movement along an axially extending brake shoe projection so that when the stroke of the brake shoe becomes greater than a permitted distance of travel of said pawl member on said brake shoe projection, said ratchet arms are pivoted to an open position thereof by said pawl member to allow said pawl member to fall into a next level of notches on said ratchet arms in order to compensate wear of said brake shoe.

14. A parking brake as defined in claim 13, wherein said brake shoe projection is biased in a direction away from said disc.

15. A parking brake as defined in claim 14, wherein said brake shoe projection is biased by a return spring.

16. A parking brake as defined in claim 13, further comprising a biasing member to prevent said first pushing member from being drawn by said brake shoe projection under normal brake mode operation.

17. A parking brake as defined in claim 16, wherein said biasing member is provided in the form of a spring-loaded dish member.

18. In a disc brake assembly having a disc and a brake shoe movable towards and away from a friction surface provided on one face of the disc, a parking brake comprising a first pushing member for moving the brake shoe towards and away from the friction surface of the disc, a first movement transmitting member displaceable between a first position wherein said first movement transmitting member forces said first pushing member against a biasing force acting thereon to maintain the brake shoe in friction engagement with the disc and a second position wherein said first pushing member is free to move in a direction away from the disc to release the brake shoe from the friction surface of the disc, and a motive means to displace said first movement transmitting member between said first and second positions thereof, wherein at least two ratchet arms are pivotally mounted to said first pushing member and biased towards a closed position wherein said ratchet arms are urged in toothed engagement with a pawl member, said ratchet arms having a number of axially spaced-apart level of notches, said pawl member being loosely mounted for limited axial movement along an axially extending brake shoe projection so that when the stroke of the brake shoe becomes greater than a permitted distance of travel of said pawl member on said brake shoe projection, said ratchet arms are pivoted to an open position thereof by said pawl member to allow said pawl member to fall into a next level of notches on said ratchet arms in order to compensate wear of said brake shoe.

19. A disc brake assembly as defined in claim 18, wherein said brake shoe projection is biased in a direction away from said disc.

20. A disc brake assembly as defined in claim 19, wherein said brake shoe projection is biased by a return spring.

21. A disc brake assembly as defined in claim 18, further comprising a biasing member to prevent said first pushing member from being drawn by said brake shoe projection under normal brake mode operation.

22. A disc brake assembly as defined in claim 21, wherein said biasing member is provided in the form of a spring-loaded dish member.

23. A parking brake for mechanical connection to a wheel of a vehicle for maintaining the vehicle stationary, comprising a disc adapted to be mounted to the wheel and having a friction surface on a face thereof, a brake shoe movable towards and away from said friction surface of said disc, and a brake actuator for normally maintaining said brake shoe against said friction surface, said brake actuator comprising a first pushing member biased in a direction away from said friction surface, said brake shoe being movable by said first pushing member, and a first cam displaceable by a motive means between a first position wherein said first pushing member is pushed against a biasing force thereof by said first cam and a second position wherein said first pushing member is allowed to return to a rest position thereof under the biasing force acting thereon, and wherein said brake shoe is applied against said friction surface as long as said first pushing member is pushed by said first cam against said biasing force thereof, wherein at least two ratchet arms are pivotally mounted to said first pushing member and biased towards a closed position wherein said ratchet arms are urged in toothed engagement with a pawl member, said ratchet arms having a number of axially spaced-apart level of notches, said pawl member being loosely mounted for limited axial movement along an axially extending brake shoe projection so that when the stroke of the brake shoe becomes greater than a permitted distance of travel of said pawl member on said brake shoe projection, said ratchet arms are pivoted to an open position thereof by said pawl member to allow said pawl member to fall into a next level of notches on said ratchet arms in order to compensate wear of said brake shoe.

24. A parking brake as defined in claim 23, wherein said brake shoe projection is biased in a direction away from said disc.

25. A parking brake as defined in claim 24, wherein said brake shoe projection is biased by a return spring.

26. A parking brake as defined in claim 23, further comprising a biasing member to prevent said first pushing member from being drawn by said brake shoe projection under normal brake mode operation.

27. A parking brake as defined in claim 26, wherein said biasing member is provided in the form of a spring-loaded dish member.

* * * * *